July 17, 1956  S. LOEW  2,754,543
CONTINUOUS WAX EXTRUSION APPARATUS
Filed Nov. 16, 1953
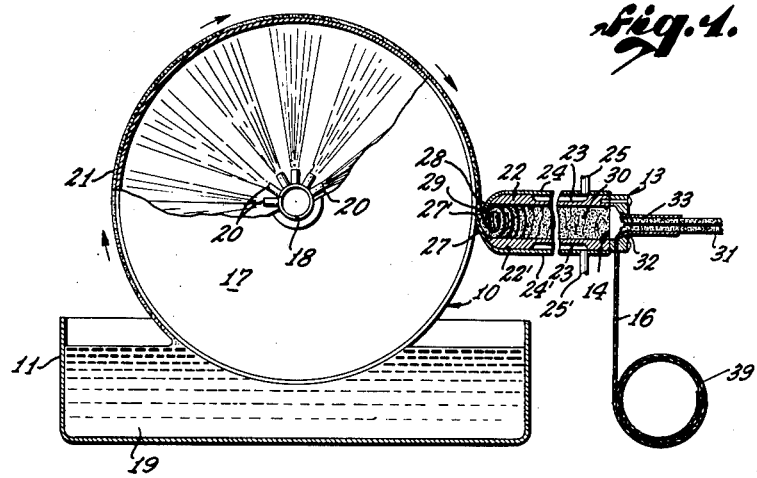
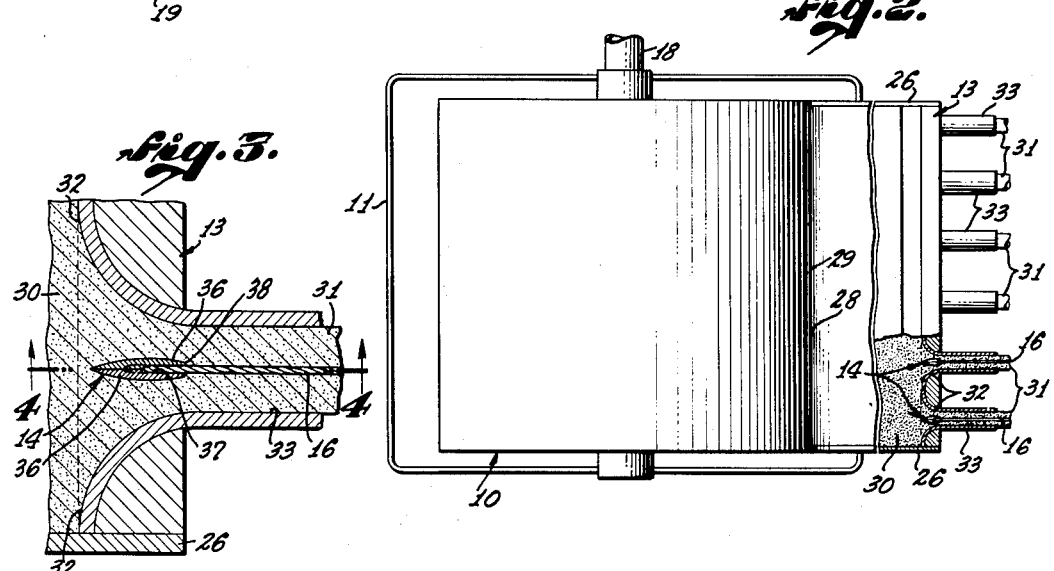
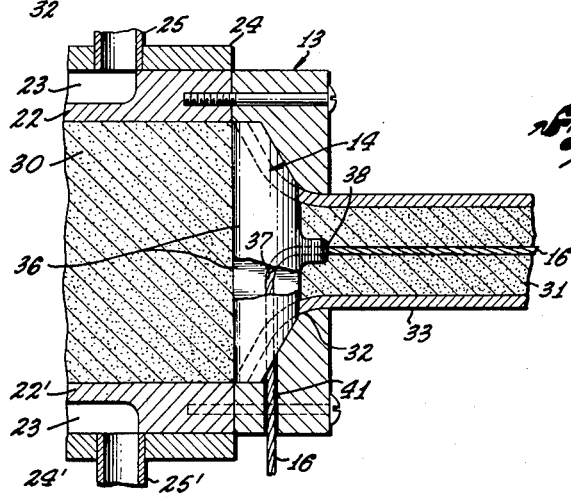
SIGMUND LOEW,
INVENTOR.
ATTORNEYS United States Patent Office 2,754,543
Patented July 17, 1956

2,754,543

CONTINUOUS WAX EXTRUSION APPARATUS

Sigmund Loew, North Hollywood, Calif.

Application November 16, 1953, Serial No. 392,313

10 Claims. (Cl. 18—13)

This invention relates to a continuous extrusion apparatus, and more particularly to a machine for extruding candles.

In conventional methods of manufacturing candles by extrusion processes, the extrusion pressure is developed by a reciprocating element such as a piston. The use of a piston or other reciprocating element is, however, undesirable, since it results in a fluctuating interrupted extrusion pressure, and also because it necessitates the carrying out of complicated or laborious operations in order to feed the wax or tallow into the extrusion chamber. Additionally, the mechanical apparatus for operating the extrusion element is relatively complex and expensive, so that the cost of a candle making machine is frequently greater than a small manufacturer can afford.

In view of the above factors characteristic of the field of candle manufacture, it is an object of the present invention to provide a highly simple and economical means for creating a continuous extrusion pressure as distinguished from the interrupted or fluctuating pressures inherent to reciprocating elements.

An additional object of the invention is to provide an apparatus for creating the necessary extrusion pressure by stripping solidified wax from a rotating drum.

A further object is to provide novel means for defining the passage through which wicking is fed into the extrusion die.

These and other objects and advantages of the invention will be more fully set forth in the following specifications and claims considered in connection with the attached drawing, wherein:

Fig. 1 is a schematic representation of the candle making apparatus of the invention, and shown primarily in vertical section;

Fig. 2 is a top plan view of the apparatus of Fig. 1, with portions of the extrusion chamber wall being broken away to illustrate the shape of the extrusion die and the location of the wick feeding elements;

Fig. 3 is an enlarged fragmentary horizontal sectional view of portion of the extrusion die; and Fig. 4 is a vertical sectional view taken along line 4—4 of Fig. 3.

Referring to the drawing, the candle making apparatus may be seen to comprise a rotating drum 10 adapted to dip molten wax or tallow from a tank 11 and deliver it in a relatively solidified layer to a stripping and extrusion unit 12, the latter serving to convert the movement imparted to the wax layer by drum 10 into extrusion pressure sufficient to force stripped wax through an extrusion die 13 to form finished candles. The apparatus also comprises novel guides 14 for inserting wicking 16 into each die aperture and at such a location that the wick emerges along the axis of the candle being formed.

The drum 10, which is hollow and has vertical end walls 17, is mounted concentrically on a horizontal shaft 18 and at such an elevation that its lower portion dips a slight distance beneath the surface of the wax or tallow 19 in tank 11. Shaft 18 is suitably journalled in bearings at opposite ends of the drum and is driven by a motor (not shown) at a constant speed selected to create the optimum extrusion action in element 12. Preferably, the shaft 18 is hollow in order that it may serve as an intake conduit for cooling water or other fluid. The water thus admitted is discharged through a plurality of nozzles 20 directed so that the water impinges upon the interior drum surface and effects a cooling action. The cooling water is continuously removed from the drum as by siphon means, not shown, in the drum bottom.

As a portion of the exterior cylindrical drum surface emerges from the molten wax 19 in tank 11, due to clockwise drum rotation as indicated by the arrows in Fig. 1, a wax layer 21 of uniform thickness is formed thereon. Because of the action of the cooling water, the wax layer 21 becomes relatively solid and firm (though plastic) by the time it reaches the stripping and extrusion element, the latter being suitably mounted on the opposite side of drum 10 from the drum portion emerging from the tank.

The stripping and extrusion element 12 comprises upper and lower body plates 22, 22' which extend horizontally for the full length of drum 10 and are maintained in spaced parallel relation by end walls 23 and by die 13, the latter bridging between portions of plates 22, 22' remote from the drum. The vertical distance between plates 22, 22' is preferably small as compared to the distance of die 13 from the drum. Plates 22, 22' are provided with recesses extending substantially throughout their length. Jacket sheets 24, 24' are attached and sealed to marginal portions of plates 22, 22' on respective sides of these recesses to cover the recesses and thus provide, in walls 22, 22', steam jacket cavities 23 through which steam is circulated by means of inlet and outlet connections 25, 25'.

According to the invention, the lower plate 22' of unit 12 is provided with a stripping knife 27, of hardened metal, curved upwardly adjacent drum 10 and terminating in a horizontal knife edge 27' which is in engagement with, and adapted to strip wax layer 21 from the exterior drum surface. Correspondingly, to the upper plate 22 there is attached a baffle which curves downwardly and terminates in a horizontal baffle edge 28, spaced from knife edge 27' by a distance approximately equal to the thickness of layer 22, thus defining a stripping orifice 29 between edges 27' and 28. With the described construction, the knife edge 27' operates to strip the wax layer 21 from the drum surface and cause it to pass through the stripping orifice 29 and into a extrusion chamber 30 defined by plates 22, 22' and 26 and by die 13, of which orifice 29 is the inlet. The curvatures of the knife 27 and the baffle adjacent drum 10 are such that the relatively solid wax entering chamber 30 tends to curl or ball up and is subjected to a kneading action. As more and more wax is fed into chamber 30 during continued rotation of the drum 10, the chamber becomes full and the pressure therein builds up due to the fact that there is no means of egress of wax except through the extrusion die 13 to be described subsequently. Heat is applied to the stripping and extrusion element 12 by the steam in jacket chambers 23, so as to soften the wax in the area of chamber 30 adjacent the extrusion die 13, while the entering wax in that portion of chamber 30 adjacent stripping orifice 29, remains relatively firm.

Accordingly, the incoming wax is compacted into a relatively non-fluid mass which, under the push of the relatively stiff web of wax passing through the stripping orifice 29, acts, piston like, against the softened body of wax adjacent the die block so as to build up a high pressure therein, sufficient to homogenize the same into a semi-fluid or highly plastic body which is of a homogeneous texture suitable for extrusion. It will be noted that die 13 is disposed a substantial distance from the drum, so that the stripped wax in chamber 30 will have become converted into a homogeneous mass by the time the die block is contacted.

A constant extrusion pressure having been created in chamber 30 due to the continuous operation of drum 10 and stripping knife 27, the wax is extruded through multiple die 13 to form the finished candles 31. The die 13 embodies a block formed with a row of openings in which are mounted funnel shaped extrusion nozzles 32 which receive wax from chamber 30 and feed it through the narrow orifice portions 33 thereof. Orifice portions 33 are cylindrical and of the diameter of the candles 31 being formed. As the candles 31 emerge from the orifice portions 33 of the extrusion nozzles they are preferably sprayed with cold water or other cooling agent in order to harden them.

Proceeding next with a description of the guide 14 for feeding the wicking 16 into the candles, two mating vertical plates 36 are mounted at the juncture of the wide and narrow portions 32 and 33 of each extrusion nozzle. Preferably, the plates 36 rest at their upper and lower portions in correspondingly formed grooves in the die block 13 and notches in nozzles 32, the arrangement being such that the plates may be readily inserted into the die block or removed therefrom when desired. As best shown in Figure 3, the wick plates 36 for each opening are in face to face engagement except where formed with matching grooves which cooperate to provide an elbow passage 37 for the wicking 16. The passage terminates in an exit nozzle 38 formed by mating projections on plates 36 at the axis of the associated extrusion opening. In the operation of the wick feeding means, the softened wax passes around each pair of plates 36 which are exteriorly streamlined for this purpose, and comes together at the exit nozzle 38 where it operates to draw the wicking 16 through its feeding passage in a continuous operation. It will be observed that the wicking is fed to the various guides 14 from a reel 39 and through passages 41 (Figure 4) in wall 24 and die block 13.

To briefly summarize the operation of the candle making apparatus the drum 10 is driven clockwise as viewed in Figure 1, to cause the formation on the exterior drum surface of a layer 21 of wax dipped from the tank 11. The wax layer 21 is cooled due to the operation of the water spray nozzles 20, and the relatively stiff wax is stripped from the drum surface by the stripping knife edge 27', to effect force feeding of wax into the extrusion chamber 30 where it balls into a piston like body in the entrance portion of chamber 30. This piston like body is pushed toward extrusion die 13, where it is kneaded and softened and caused to become homogeneous by the time it reaches the die 13. It passes through die 13 due to the pressure created by the continued rotation of drum 10 and consequent feeding and stripping of the wax. As the wax is extruded through die 13, the wicking 16 is inserted axially thereof due to operation of the wick guides 14.

It is to be understood that the orifice portions 33 of nozzles 32 may be either cylindrical or any other selected cross-sectional shape, whereby candles of either plain circular, oval, square fluted, or any other selected cross-sectional shape, may be extruded. Also, the invention contemplates the possibility of changing the extrusion nozzles at will. Accordingly, the nozzles are preferably mounted loosely in their mating apertures in the die block, and the latter is removably attached, as by screws 42, to the body plates 22, 22'.

The wick guides 14 need not necessarily be formed in mating halves. It is possible to utilize integrally cast one-piece guides, utilizing known casting methods such as the "lost wax" method.

I claim:

1. Apparatus for extruding candles, comprising: a tank for molten candle wax; a drum having a cylindrical exterior surface; journal means carried by the tank in which said drum is mounted for rotation on a generally horizontal axis, with its lower portion disposed in said tank and dipping into said molten wax; means for continuingly rotating said drum to effect the formation of a layer of wax on said cylindrical surface where it emerges from the body of molten wax in the tank; a stripping knife having an edge disposed closely adjacent said cylindrical surface in a position to strip said wax layer therefrom; a baffle having an edge spaced from said stripping knife edge and from said cylindrical surface by a distance slightly greater than the thickness of said wax layer; means associated with said stripping knife and baffle to form a substantially closed extrusion chamber having an inlet slot defined between said knife and baffle edge, through which said wax layer passes; said associated means including an extrusion die adapted to receive wax from said extrusion chamber and to shape the same into a candle; and means to feed wicking axially into said candle as it is being formed in said die.

2. Apparatus for extruding wax articles of rod form, comprising: a tank for containing molten wax; a drum having a cylindrical exterior surface; journal means carried by the tank in which said drum is mounted for rotation on a generally horizontal axis with its lower portion disposed in said tank and dipping into said molten wax; means for continuingly rotating said drum to effect the formation of a layer of wax on said cylindrical surface where it emerges from the body of molten wax in the tank; a stripping knife having an edge disposed closely adjacent said cylindrical surface in a position to strip said wax layer therefrom; a baffle having an edge spaced from said stripping knife edge and from said cylindrical surface by a distance slightly greater than the thickness of said wax layer; means associated with said stripping knife and baffle to form a substantially closed extrusion chamber having an inlet slot defined between said knife and baffle edge, through which said wax layer passes; said associated means including an extrusion die adapted to receive wax from said extrusion chamber and to shape the same into rod form.

3. Apparatus for extruding wax, which comprises: a conveyor having a relatively smooth continuous surface; means to form a layer of hardened wax on said surface; means defining an extrusion chamber; a knife disposed to strip said wax layer from said surface during movement of said conveyor, said knife being associated with said extrusion chamber in such a way that the wax stripped from said surface passes directly into said chamber, baffle means disposed on the opposite side of said stripped wax from said knife to prevent exit of said wax from said chamber adjacent its point of entrance thereto, and an extrusion die disposed remote from said knife to receive said stripped wax after kneading and pressurizing thereof in said chamber.

4. The invention as claimed in claim 3, wherein said baffle means is spaced from the stripping edge of said knife a distance approximately equal to the thickness of said wax layer.

5. Apparatus for extruding candles, comprising: a tank for containing molten candle wax, a drum the lower portion of which is disposed in said tank means mounting said drum in the tank for rotation on a substantially horizontal axis; said drum having a cylindrical exterior surface; means for rotating said drum continuously to effect the formation of a layer of wax on that portion of said exterior drum surface which emerges from said tank; a stripping knife having an edge disposed closely adjacent said surface and operating to strip said wax layer therefrom; a baffle edge spaced from said stripping knife edge and from said surface by a distance substantially equal to the thickness of said wax layer; means associated with said stripping knife and baffle edge to form a substantially closed extrusion chamber having an inlet slot defined between said knife and baffle edge, through which said wax layer passes; said associated means including an extrusion die adapted to receive wax from said extrusion chamber and shape the same into a candle, and means to feed wicking axially into said candle as it is formed in said die.

6. The invention as claimed in claim 5, including means to cool said drum at a point in advance of said stripping knife, whereby the wax entering said chamber will be relatively stiff so as to ball into a piston-like body of low fluidity; and means for heating that portion of the wax in the area of said chamber adjacent said extrusion die, whereby that portion of the wax will attain a homogeneous state and will be rendered more fluid so as to be readily extrudible through said die.

7. The invention as claimed in claim 6, wherein said stripping knife and baffle edge are correspondingly curved in a manner effecting balling and kneading of said wax layer into a homogeneous mass prior to its passage through said die.

8. The invention as claimed in claim 5, wherein said wick feeding means comprises a pair of plates in surface engagement with each other and removably seated in corresponding recesses in said die, said plates being formed at their engaged surfaces with matched grooves creating a passage for said wicking.

9. Apparatus as defined in claim 2, including means to cool said drum in the upper area thereof above the molten wax in the tank, whereby the layer of wax approaching the stripping knife will be rendered relatively stiff to facilitate stripping and so as to cause the wax entering said chamber to ball into a piston-like body of low fluidity; and means for heating that portion of the wax in the area of said chamber adjacent said extrusion die, whereby that portion of the wax will attain a homogeneous state and will be rendered more fluid so as to be readily extrudible through said die.

10. Apparatus as defined in claim 3, including means to cool said conveyor in an area thereof where said wax layer is approaching said stripping knife, whereby the wax entering said chamber will be relatively stiff so as to ball into a piston-like body of low fluidity; and means for heating that portion of the wax in the area of said chamber adjacent said extrusion die, whereby that portion of the wax will attain a homogeneous state and will be rendered more fluid so as to be readily extrudible through said die.

References Cited in the file of this patent
UNITED STATES PATENTS

| | | |
|---|---|---|
| 2,654,123 | Hall | Oct. 6, 1953 |
| 2,657,427 | Upton | Nov. 3, 1953 |
| 2,679,069 | Keogh | May 25, 1954 |